US010827237B2

(12) United States Patent
Scordilis et al.

(10) Patent No.: US 10,827,237 B2
(45) Date of Patent: Nov. 3, 2020

(54) METHOD FOR PROVIDING INFORMATION ABOUT A MECHANICAL WRISTWATCH

(71) Applicant: The Swatch Group Research and Development Ltd, Marin (CH)

(72) Inventors: Thierry Scordilis, Cormondreche (CH); Arnaud Casagrande, Bole (CH); Luca De Rosa, Colombier (CH); Jean-Luc Arend, Corcelles (CH); Jean Gorisse, Neuchatel (CH); Zoran Randjelovic, Corcelles (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/397,254

(22) Filed: Apr. 29, 2019

(65) Prior Publication Data
US 2019/0387288 A1 Dec. 19, 2019

(30) Foreign Application Priority Data

Jun. 19, 2018 (EP) .................................... 18178507

(51) Int. Cl.
*G08B 21/00* (2006.01)
*H04Q 9/00* (2006.01)
(Continued)

(52) U.S. Cl.
CPC ................. *H04Q 9/00* (2013.01); *G04B 5/20* (2013.01); *G04D 7/002* (2013.01);
(Continued)

(58) Field of Classification Search
CPC ............... H04Q 9/00; H04Q 2209/886; H04Q 2209/823; H04Q 2209/40; G04D 7/002;
(Continued)

(56) References Cited

U.S. PATENT DOCUMENTS

2015/0128733 A1* 5/2015 Taylor ..................... H02J 50/80
73/865.8
2016/0164746 A1 6/2016 Nicolas et al.
(Continued)

FOREIGN PATENT DOCUMENTS

JP 2006-055189 3/2006
JP 2017-138864 9/2017
(Continued)

OTHER PUBLICATIONS

European Search Report dated Dec. 11, 2018 in European Application 18178507.2 filed on Jun. 19, 2018.
(Continued)

*Primary Examiner* — Tanmay K Shah
(74) *Attorney, Agent, or Firm* — Oblon, McClelland, Maier & Neustadt, L.L.P

(57) ABSTRACT

A method for providing information about a mechanical wristwatch, including the following steps, performed by the wristwatch: harvesting an intermittently available external energy, storing the harvested energy, at the end of a predefined period of time, generating an analysis report on an activity of the owner of the wristwatch, based at least on the times and durations of availability of the external energy, when or after the harvested energy quantity reaches a threshold, the threshold being on or above an energy level required to power a transmission unit of the wristwatch, wirelessly transmitting the analysis report to a distant reader with the transmission unit.

10 Claims, 3 Drawing Sheets

(51) Int. Cl.
*G04B 5/20* (2006.01)
*G04D 7/00* (2006.01)

(52) U.S. Cl.
CPC ... *H04Q 2209/40* (2013.01); *H04Q 2209/823* (2013.01); *H04Q 2209/886* (2013.01)

(58) Field of Classification Search
CPC .......... G04B 5/20; G04C 10/04; G04G 21/04; G04G 9/0064
USPC .................................................... 340/870.16
See application file for complete search history.

(56) References Cited

U.S. PATENT DOCUMENTS

2016/0291550 A1* 10/2016 Chen ...................... H02J 7/025
2017/0185048 A1 6/2017 Yuen
2018/0101140 A1 4/2018 Yuen

FOREIGN PATENT DOCUMENTS

WO WO 2016/181605 A1 11/2016
WO WO 2017/130912 A1 8/2017

OTHER PUBLICATIONS

Japanese Office Action dated Jul. 7, 2020, issued in Japanese Patent Application No. 2019-098370 (with English translation).

\* cited by examiner

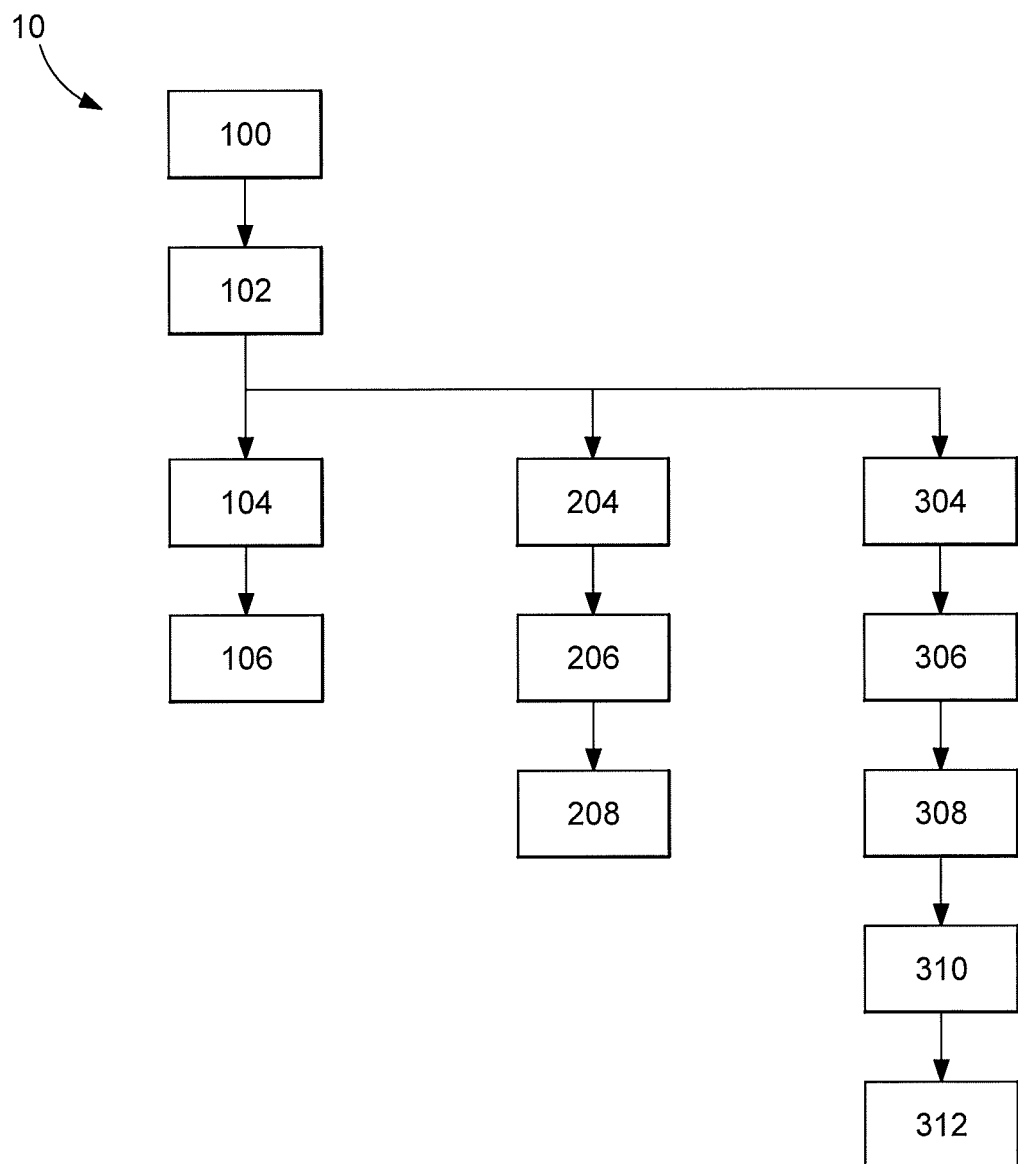

METHOD FOR PROVIDING INFORMATION ABOUT A MECHANICAL WRISTWATCH

CROSS-REFERENCE TO RELATED APPLICATION

This application claims priority to European Patent Application No. 18178507.2 filed on Jun. 19, 2018, the entire disclosure of which is hereby incorporated herein by reference.

TECHNICAL FIELD

The present invention relates to a method for providing a distant reader with information about a mechanical wristwatch. The distant reader may be a smartphone. The information comprises at least an analysis report on an activity of the owner of the wristwatch.

BACKGROUND OF THE INVENTION

There is a growing demand to increase the number of functionalities of mechanical wristwatches, both from clients and from watch consumer services. In particular, it would be useful to transmit information, such as an analysis report on an activity of the owner of the wristwatch, an alarm message representative of a malfunction detected by the wristwatch, or a diagnostic report representative of an operating condition of the wristwatch.

Today, this requires embedding an electrical energy source in the mechanical wristwatch, such as a Lithion-ion battery. Said electrical energy source must have a large storage capacity in order to perform wireless transmissions to a distant reader, such as a smartphone. A major drawback is the space this electrical energy source takes in the wristwatch.

SUMMARY OF THE INVENTION

It is an object of the present invention to overcome this drawback, and propose a method for providing a distant reader with information from a mechanical wristwatch, wherein said wristwatch does not require having an electrical energy source.

According to a first aspect, the invention relates to a method as recited in claim 1.

Thus, external energy is harvested, stored, used as an activity tracker, and used to perform the transmission of the analysis report.

Other aspects of the invention are recited in the dependent claims attached hereto.

According to a second aspect, the invention relates to a wristwatch suitable for carrying out the method according to the first aspect.

BRIEF DESCRIPTION OF THE DRAWINGS

Other features and advantages of the invention will become apparent from the following description of a non-limiting example embodiment, with reference to the appended drawings, in which:

FIG. 4 is a block diagram showing steps of a method according to the invention.

DETAILED DESCRIPTION OF THE INVENTION

Figure 1:
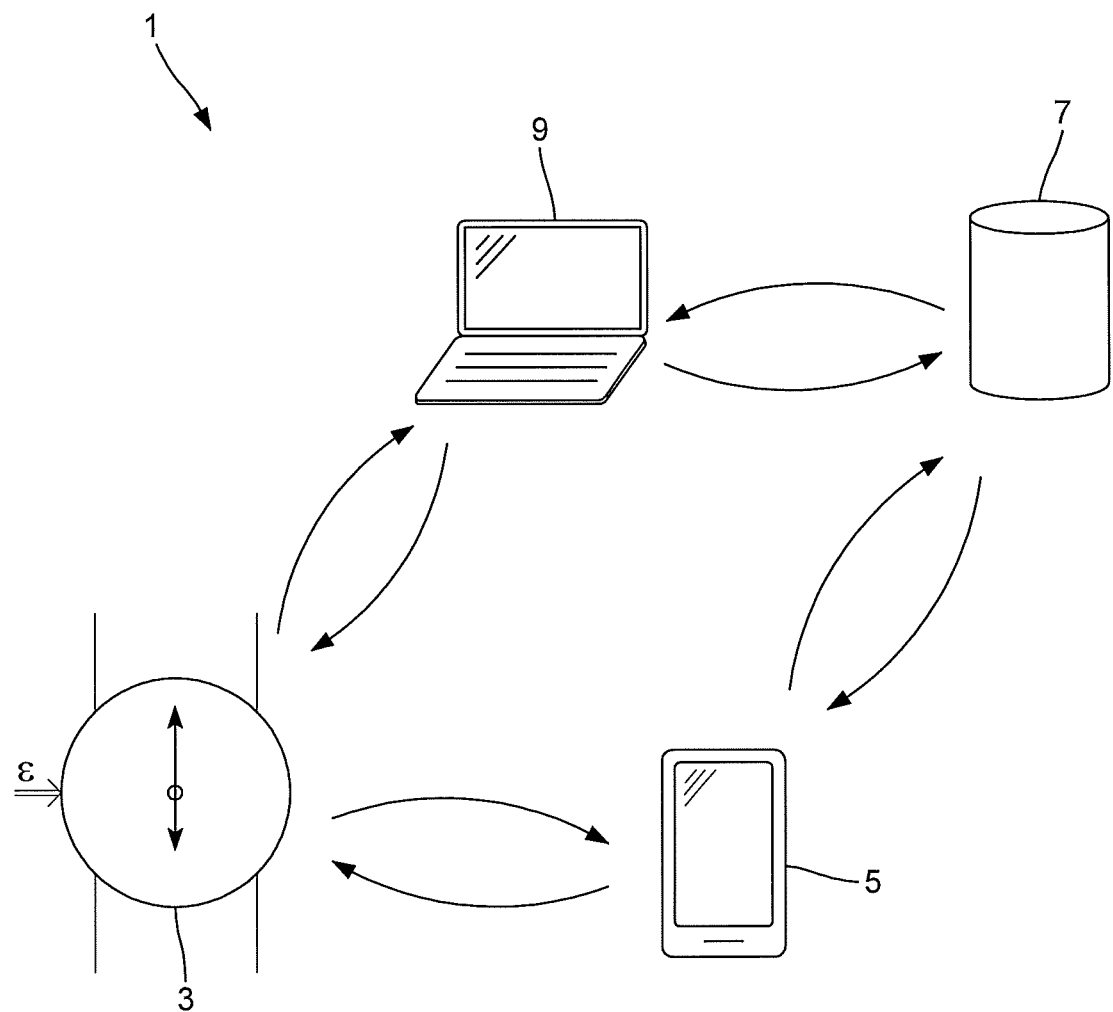
FIG. 1 shows elements of a communication system comprising a mechanical wristwatch according to the invention and a distant reader.

An embodiment of the present invention will now be described in detail with reference to the attached figures. Identical or corresponding functional and structural elements which appear in different drawings are assigned the same reference numerals.

FIG. 1 illustrates a communication system 1, where the teachings of the present invention can be implemented. There is shown a mechanical wristwatch 3 that comprises no battery or any other electrical energy source. There is also shown a wireless communication device, referred to as distant reader 5, which in this example is a mobile phone, and more specifically a smartphone. The distant reader 5 may belong to a user of the wristwatch 3. As explained later in more detail, the wristwatch 3 is arranged to set up a wireless communication link with the distant reader 5 to transmit certain information or data to the distant reader 5. In an embodiment, the wristwatch 3 is also arranged to receive certain commands, information or data from the distant reader 5. These two unidirectional communication links may be implemented by using different communication standards.

FIG. 1 further shows a server 7. In this example, the server 7 belongs to, or is managed by, a manufacturer of the wristwatch 3. A bidirectional data communication link can be established between the distant reader 5 and the server 7. A bidirectional communication link can also be established between the server 7 and a data processing device 9, such as a desktop computer, a laptop computer, a smartphone, a tablet or any similar data processing device that has a flashlight and/or means to transmit infrared (IR) and/or ultraviolet (UV) radiation. In this example, the data processing device 9 belongs to an authorized retailer of the wristwatch manufacturer. Two unidirectional communication links can be established between the wristwatch 3 and the data processing unit 9. Here again, these two communication links may be based on two different communication standards.

Figure 2:
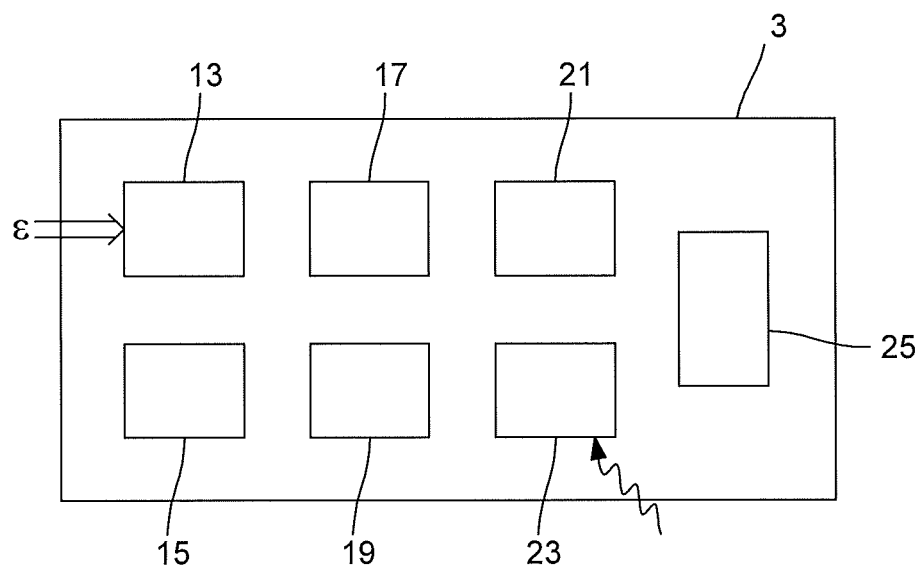
FIG. 2 is a block diagram illustrating components of the mechanical wristwatch of FIG. 1.

FIG. 2 is a block diagram illustrating components of the wristwatch 3, which are useful for understanding the teachings of the present invention. As shown in FIG. 2, the wristwatch comprises an energy harvesting unit 13 configured to collect or derive energy from one or more external energy sources. For instance, energy can be harvested from any or a combination of the following energy sources: solar radiation, other electromagnetic radiation in the wavelengths visible to the human eye, infrared radiation, ultraviolet radiation, thermal radiation and movements of the wristwatch. To harvest energy from solar radiations or electromagnetic radiations at visible, infrared or ultraviolet range, the energy unit 13 may comprise a photovoltaic cell. To harvest energy from heat, the energy harvesting unit 13 may comprise a thermoelectric generator (TEG), also called Seebeck generator, which is a device arranged to convert heat flux (temperature differences) into electrical energy through the Seebeck effect.

The energy harvested by the energy harvesting unit 13 can be stored in an energy storage unit 15 of the wristwatch 3, which may be for instance a supercapacitor or a solid-state battery having both solid electrodes and solid electrolytes.

The energy harvesting operation may be used to track an activity of the user of the wristwatch 3. For example, if the energy harvesting is based on the movement of the wristwatch 3, this gives an indication on the physical activity of the user. This also gives an indication on when and how long the wristwatch is worn. Furthermore, if the energy harvesting is based on solar energy, this gives an indication on the light exposure of the wristwatch. On the other hand, if the energy harvesting is based on heat flux or temperature differences, then it can be determined when the wristwatch 3 was worn by the user. Thus, using the times and durations of availability of the external energy, and the available quantities of harvested energy, an analysis report on an activity of the owner of the wristwatch may be computed.

In one embodiment, the external energy is at least in part kinetic energy resulting from movements of the wristwatch, and the report analyses at least an activity level of the wristwatch wearer during the predefined period of time. In another embodiment that may be combined to the previous one, the external energy is at least in part solar energy resulting from solar radiations in the surrounding environment of the wristwatch, and the report analyses at least lightening levels of the wristwatch during the predefined period of time. In another embodiment that may be combined to one or both of the previous ones, the external energy is at least in part thermal energy resulting from temperature differences between the wristwatch, the wrist of the wristwatch wearer and the surrounding environment of the wristwatch, and the report analyses at least when and for long the wristwatch has been worn during the predefined period of time.

The wristwatch 3 further comprises a wireless data transmission unit 21, which may be a radio-frequency (RF) transmission unit operating for instance according to the Bluetooth wireless technology standard. RF is understood to cover any of the electromagnetic wave frequencies that lie in the range extending from around 3 kHz to 300 GHz. It is to be noted that, in this example, in order to keep the hardware block as small as possible and to minimize current consumption, the transmission unit 21 is arranged to transmit only, i.e. it is not arranged to receive any signals in the RF band. A data reception path is implemented using an optical link, as explained below. The energy required for operating the transmission unit 21 is obtained from the energy collected by the energy harvesting unit 13 and stored in the energy storage unit 15.

The wristwatch 3 further comprises a receiving unit 23 for detecting and receiving an electromagnetic radiation beam. This electromagnetic radiation beam may be in the visible light spectrum (wavelength in the range of 400 nm to 700 nm), in the infrared spectrum (in the range of 700 nm to 1000000 nm), or in the ultraviolet spectrum (in the range of 10 nm to 400 nm). In the present invention, the word "light" is used in its broad sense and is understood to cover the whole above mentioned electromagnetic radiation spectrum.

The wristwatch 3 also comprises an optical demodulator 17 for demodulating modulated electromagnetic radiation beams received by the receiving unit 23, so as to retrieve a message embedded in said beam.

A security management unit 19 of the wristwatch 3 closely cooperates with the optical demodulator 17. The purpose of the security management unit 19 is to manage external access to the wristwatch and to its data. For instance, this unit determines whether or not the received message is correct and genuine. The security management unit 19 may also be used to select data, based on the demodulated message, to be transmitted to an external device (the data processing unit 9 or the distant reader 5, for instance).

Figure 3:
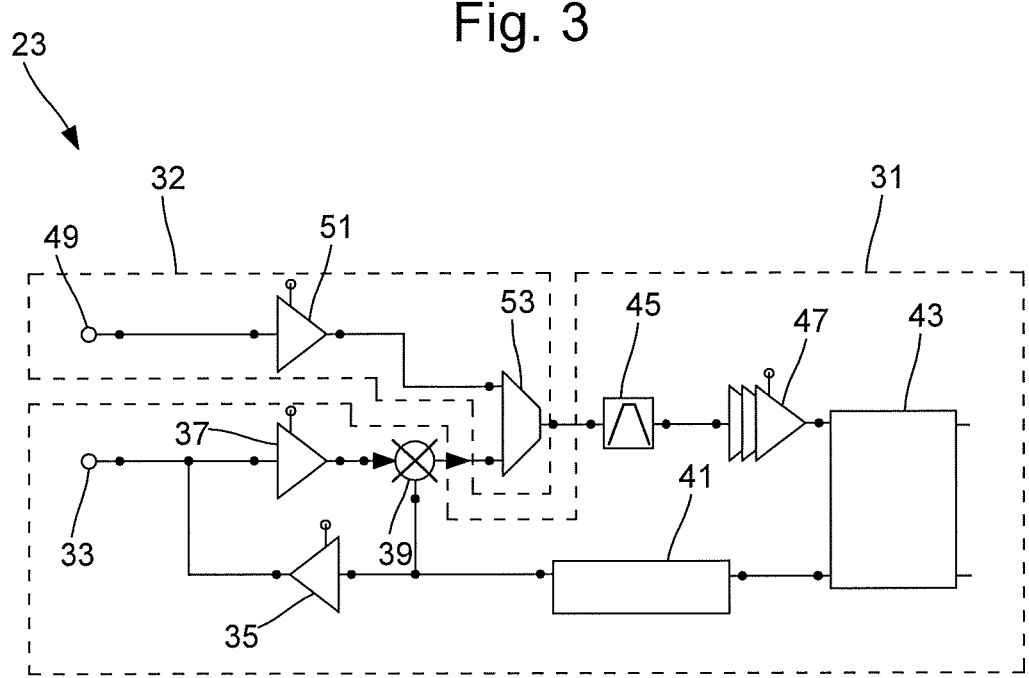
FIG. 3 is a circuit diagram illustrating an optical-RF receiving unit of the wristwatch of FIG. 1.

In an embodiment, the receiving unit is able to receive both optical and radio frequency waves. The RF receiver may be used to configure the wristwatch, in particular to define transmission intervals or transmission times. FIG. 3 is a circuit diagram illustrating an example implementation of such an optical-RF receiving unit 23, which can be divided into two portions, namely an RF circuit portion 31 and an optical circuit portion 32. The RF circuit portion 31 comprises an RF input-output node 33, which is connected to a power amplifier 35 and to a low noise amplifier 37, which in turn is connected to a mixer 39. The power amplifier 35 and the low noise amplifier 37 are connected in parallel. The mixer 39 is also connected to the power amplifier 35 and to a delta-sigma modulator & synthesizer 41, which in turn is connected to the demodulator 17. The RF circuit portion 31 further comprises a bandpass filter 45 connected in series with a set of amplifiers 47, which is connected to the demodulator 17. It is to be noted that the demodulator 17 is in this example also connected to the microcontroller unit 25.

The optical circuit portion 32 comprises an optical input node 49 connected to an optical amplifier 51, which in turn is connected to a multiplexer 53 with two input lines, i.e. one from the mixer 39 and the other from the optical amplifier 51. The multiplexer 53 is arranged to select one of the input signals and forwards the selected input into a single output line leading to the bandpass filter 45. In this manner, the multiplexer 53 operates as a switch. It is thus possible to use the intermediate frequency portion of the RF circuit (i.e. the RF circuit portion 31) and inject the optical signal into it by using the multiplexer 53. This ensures that it is possible to use the high sensitivity of the demodulator 17 for the optical signal. Furthermore, the proposed circuit implementation makes it possible to share the receiving channels, and the chipset surface size can be reduced. It is also possible to reuse the functions of the discrete Fourier transform (DFT) at low power, which are already present in the chipset, and which allow separating up to 255 different bins.

Lastly, the wristwatch 3 comprises a microcontroller 25 for managing the overall operation and controlling the other components of the wristwatch.

The operation of the wristwatch 3 is now explained in more detail, with reference to FIG. 4. In this example, the wristwatch 3 has three distinct operational modes.

During a first mode, referred to as a normal mode, energy is harvested by the energy harvesting unit 13 (step 100) and stored in the energy storage unit 15 (step 102). At the end of a predefined period of time, an analysis report on an activity of the owner of the wristwatch 3 is generated (step 104), based at least on the times and durations of availability of the external energy. Once enough energy is collected for a transmission (that is to say, when or after the harvested energy quantity reaches a threshold representative of the minimal energy needed to power the transmission unit), the analysis report is transmitted to the distant reader 5 by using the transmission unit 21 (step 106). In this example, the transmission is carried out by using the Bluetooth wireless technology standard. It is to be noted that the user of the wristwatch 3 may configure the wristwatch 3 to define a transmission schedule. It is possible to define the data transmissions to take place at (a) given time instant(s) each day or on given dates only, i.e. the transmissions take place at regular time intervals. Alternatively, instead of defining transmission times, a time interval between consecutive data transmissions may be defined. Furthermore, it is also possible to configure the wristwatch 3 to initiate a data transmission as soon as sufficient energy has been collected.

During a second operational mode, referred to as an addressed message mode, the wristwatch 3 detects, via the receiving unit 23, an electromagnetic radiation beam (step 304). Then, the wristwatch retrieves a diagnosis request embedded in said beam (step 306). The diagnosis request is addressed or dedicated to the wristwatch 3. The request advantageously identifies the entity sending the request. The wristwatch 3 may then use a challenge-response authentication protocol to authenticate the entity who issued the request (step 308). For this purpose, a challenge code issued by the wristwatch 3 may be used. However, the challenge code may initially be issued by the manufacturer of the wristwatch 3 and provided to the wristwatch 3 by the manufacturer. Thus, the manufacturer may administer the challenge-response authentication process. It can for instance ensure that only one or a restricted number of devices can get access to the data on the wristwatch 3 by having the correct access code(s). The wristwatch 3 may thus send the received challenge code to the data processing device 9, which may need to authenticate itself with the server 7 of the manufacturer before replying to the wristwatch 3. It is to be noted that that the received request may comprise information that allows the wristwatch 3 to contact the data processing device 9 or any other device indicated in the modulated request. Once the entity sending the request has been authenticated, the wristwatch 3 then generates a diagnostic report representative of an operating condition of the wristwatch 3 (step 310). When or after the harvested energy quantity reaches the threshold, the transmission unit 21 wirelessly transmits the diagnostic report to the data processing device 9 (step 312).

During a third operational mode, referred to as an alarm mode, the wristwatch 3 detects an alarm (step 204). This alarm refers to a malfunction of an element or a function of the wristwatch 3. The detected malfunction may relate to a sealing problem or a timekeeping problem or to any other detectable problem. If an alarm has been detected, and assuming enough energy has been collected, then the wristwatch 3 generates an alarm message representative of the detected malfunction (step 206). Then, when or after the harvested energy quantity reaches the threshold, the transmission unit 21 sends the alarm message to the data processing device 9 (step 208). The user of the data processing device 9 may then review the alarm message on the screen of the device and optionally forward the alarm message to the server 7 of the manufacturer. The manufacturer may then take appropriate actions to solve the problem.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. It is possible to obtain further variants of the invention by combining teachings from one or more of the examples above.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for providing information about a mechanical wristwatch, comprising the following steps, performed by the wristwatch:
    harvesting an intermittently available external energy;
    storing the harvested energy;
    at the end of a predefined period of time, generating an analysis report on an activity of an owner of the wristwatch, based at least on times and durations of availability of the external energy; and
    when or after harvested energy quantity reaches a threshold, said threshold being on or above an energy level required to power a transmission unit of the wristwatch, wirelessly transmitting the analysis report to a distant reader with said transmission unit.

2. The method according to claim 1, wherein the analysis report is also based on the available quantities of harvested energy.

3. The method according to claim 1, wherein the external energy is at leak in part kinetic energy resulting from movements of the wristwatch, and the report analyses at least an activity level of a wristwatch wearer during the predefined period of time.

4. The method according to claim 1, wherein the external energy is at least in part solar energy resulting from solar radiations in a surrounding environment of the wristwatch, and the report analyses at least lightening levels of the wristwatch during the predefined period of time.

5. The method according to claim 1, wherein the external energy is at least in part thermal energy resulting from temperature differences between the wristwatch, a wrist of a wristwatch wearer and a surrounding environment of the wristwatch, and the report analyses at least when and for how long the wristwatch has been worn during the predefined period of time.

6. A method for providing information about a mechanical wristwatch, comprising the following step, performed by the wristwatch:
    harvesting an intermittently available external energy
    storing the harvested energy
    at the end of a predefined period of time, generating an analysis report on an activity of an owner of the wristwatch, based at least on times and durations of availability of the external energy
    when or after harvested energy quantity reaches a threshold, said threshold being on or above an energy level required to power a transmission unit of the wristwatch, wirelessly transmitting the analysis report to a distant reader with said transmission unit
    the method further comprising the following steps, performed by the wristwatch:
    detecting a malfunction of the wristwatch
    generating an alarm message representative of the detected malfunction
    when or after the harvested energy quantity reaches the threshold, wirelessly transmitting the alarm message to a data processing device with said transmission unit.

7. A method for providing information about a mechanical wristwatch, comprising the following steps, performed by the wristwatch:
    harvesting an intermittently available external energy
    storing the harvested energy at the end of a predefined period of time, generating an analysis report on an activity of an owner of the wristwatch, based at least on times and durations of availability of the external energy when or after harvested energy quantity reaches a threshold, said threshold being on or above an energy level required to power a transmission unit of the wristwatch, wirelessly transmitting the analysis report to a distant reader with said transmission unit the method further comprising the following steps, performed by the wristwatch:
   detecting an electromagnetic radiation beam
   retrieving a diagnosis request embedded in said beam
   generating a diagnostic report representative of an operating condition of the wristwatch
   when or after the harvested energy quantity reaches the threshold, wirelessly transmitting the diagnostic report to a data processing device with said transmission unit.

8. The method according to claim 7, wherein the electromagnetic radiation beam is a visible light, infrared or ultraviolet beam.

9. The method according to claim 8, comprising the following step, performed by the wristwatch: authenticating the diagnosis request.

10. A wristwatch configured to carry out a method according to claim 1.

* * * * *